United States Patent [19]
Sassi

[11] Patent Number: 4,486,116
[45] Date of Patent: Dec. 4, 1984

[54] FRICTION JOINT FOR JOINING TOGETHER MACHINE ELEMENTS

[75] Inventor: Kari Sassi, Lohja, Finland

[73] Assignee: Konejukka Oy, Finland

[21] Appl. No.: 395,034

[22] PCT Filed: Nov. 16, 1981

[86] PCT No.: PCT/FI81/00084
§ 371 Date: Jun. 17, 1982
§ 102(e) Date: Jun. 17, 1982

[87] PCT Pub. No.: WO82/01750
PCT Pub. Date: May 27, 1982

[30] Foreign Application Priority Data
Nov. 18, 1980 [FI] Finland ............ 803596

[51] Int. Cl.³ .............................. B25G 3/20
[52] U.S. Cl. ................... 403/367; 403/351; 403/374; 292/349
[58] Field of Search ........... 403/367, 366, 368, 374, 403/370, 365, 409, 373, 377, 351; 248/410; 292/306, 349, 178; 285/DIG. 3, 340; 188/67

[56] References Cited

U.S. PATENT DOCUMENTS

| | | | |
|---|---|---|---|
| 556,587 | 3/1896 | Noack | 403/366 X |
| 2,798,748 | 7/1957 | Maurer | 403/372 |
| 2,805,873 | 9/1957 | Brennan et al. | 285/340 |
| 2,888,284 | 5/1959 | Holmberg | 403/365 |
| 3,334,931 | 8/1967 | Holt et al. | 403/365 |
| 3,884,508 | 5/1975 | Jones | 285/DIG. 3 X |

FOREIGN PATENT DOCUMENTS

| | | | |
|---|---|---|---|
| 2017149 | 10/1971 | Fed. Rep. of Germany | 403/370 |
| 904788 | 3/1945 | France | 403/377 |

*Primary Examiner*—Andrew V. Kundrat
*Attorney, Agent, or Firm*—Steinberg & Raskin

[57] ABSTRACT

Friction joint for fixing machine elements together. The friction joint is established with the aid of at least one sleeve-like member (15) so that the sleeve-like member (15) is disposed around the first machine element (11) and that the second machine element (12) is adapted to receive the sleeve-like member (15). In the friction joint of the invention (10) the sealing problems have been totally avoided by employing a tiltable sleeve-like member (15) which is tiltable with the aid of a tilting means (17) through an angle ($\alpha$), whereby the inner surface of the sleeve-like member (15) creates an interlocking with the first machine element (11) and similarly the outer surface of the sleeve-like member (15) creates an interlocking with the second machine element (12). The tilting means (17) is a tightening screw, disposed in a threaded hole (16) made to pass through the end face of the sleeve-like member (15). With the aid of sleeve-like member (15) a sprocket wheel (12) with hub (13) can be mounted on a shaft (11) in an easy and simple way. When it is desired to mount on a shaft a hubless sprocket wheel, two sleeve-like members are used, the tightening screw of one sleeve-like member being disposed to cause simultaneous tilting of both sleeve-like members.

14 Claims, 5 Drawing Figures

FRICTION JOINT FOR JOINING TOGETHER MACHINE ELEMENTS

BACKGROUND OF THE INVENTION

The present invention concerns a friction joint for fixing a first machine element to a second machine element, said friction joint being established with the aid of at least one sleeve-like member so that said sleeve-like member has been disposed around said first machine element, and that said second machine element has been disposed to receive said sleeve-like element.

For integral joining between a shaft and a hub, a keyway and a simple uniform key have long been applied. As a consequence of better materials and more accurate manufacturing procedures, a friction joint of this type is too coarse nowadays.

The following characteristics, among others, are required of ideal tightenable joints. The shaft and the central hub hole must be completely cylindrical. The tolerances and surface quality requirements of the force-transmitting joint must be reasonable. The joint must retain the original centering. It must be possible to separate and reestablish the joint several times. Axial displacement of the joint should be easy to accomplish. Establishing of the joint should not require the use of special tools. The direction of torque (driving vs. driven) must be changeable in a force-transmitting joint. The friction joint should not necessitate the use of securing keys and the like, whereby economy in shaft thickness becomes possible.

The characteristics listed above are not achievable with a conventional key joint, and the key joint is therefore a rather unsatisfactory solution.

For the purpose of establishing a friction joint, the so-called ETP sleeve has recently been developed, by the aid of which it is possible to mount on a shaft elements such as sprocket wheels, belt pulleys, gear wheels, clutches, cams, flywheels, rolls, levers, cutting disks, etc. A sleeve of this type replaces the conventional joint constructions previously applied, such as keyways, rifling, splining, set screws, welded, cone, tightening and crimp joints, etc. The ETP sleeve expands against the two surfaces which are meant to transmit the torque. This expansion is achieved by means of a pressure fluid applied between the inner and outer walls of the sleeve. The pressure fluid is acted upon by a pressure ring, which is tightened by means of common hex head screws. Although by this design a number of remarkable advantages are gained, its greatest drawback are its scaling problems. It is also a fact that the ETP sleeve comprises a great number of components and this solution is therefore comparatively complex.

SUMMARY OF THE INVENTION

The object of the invention is to achieve an improvement of friction joints known in the art. The more detailed object of the invention is to provide a friction joint in which sealing problems have been totally avoided. A further object of the invention is to provide a friction joint which is as simple as possible in its construction but which is nevertheless reliable in operation. The other objects of the invention and the advantages obtained thereby will be apparent from the disclosure of the invention.

The objects of the invention are achieved by means of a friction joint mainly characterized in that it includes a sleeve-like member which is tiltable by means of a tilting device, through a certain angle, whereby the inner surface of the sleeve-like member creates an interlocking with the first machine element and, in like manner, the outer surface of the sleeve-like member creates an interlocking with the second machine element.

Other features of the friction joint of the invention are recited in the claims following this specification.

The remarkable advantages obtained by the friction joint of the invention, compared with the ETP sleeve, include the following. The torque transmitted by the friction joint can be regulated, whereby the friction joint may also be applied as an over-load clutch. It is possible in the friction joint of the invention to make the friction ring, shaft and hub of one and the same material, whereby temperature variations cause no variations in the joint. The space requirement in the axial direction of the friction joint of the invention is minimal. The friction joint of the invention can be made of any material whatsoever. The manufacturing and installation of the friction joint of the invention are exceedingly simple and inexpensive.

DETAILED DESCRIPTION OF THE DRAWINGS

The invention is described in greater detail with reference being made to certain advantageous embodiments of the invention, presented in the figures of the attached drawing, to which embodiments however the invention is not meant to be exclusively confined.

Figure 1:
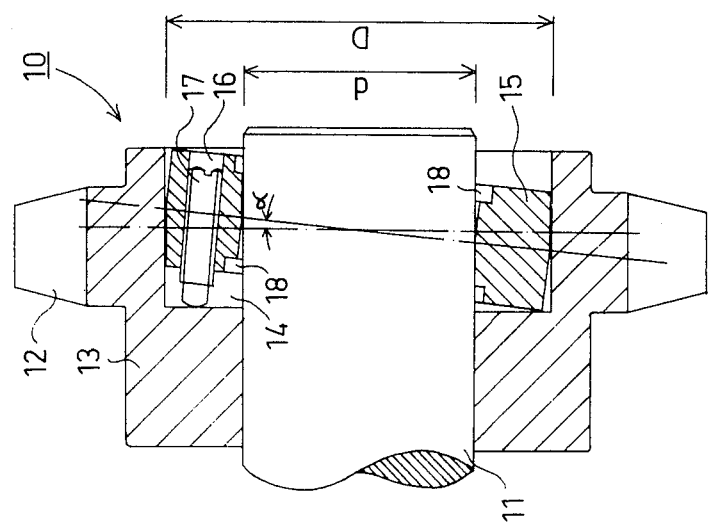

FIG. 1 presents, in section, an advantageous embodiment of a friction joint according to the invention, adapted to the mounting of a sprocket wheel with hub on a shaft.

Figure 2:
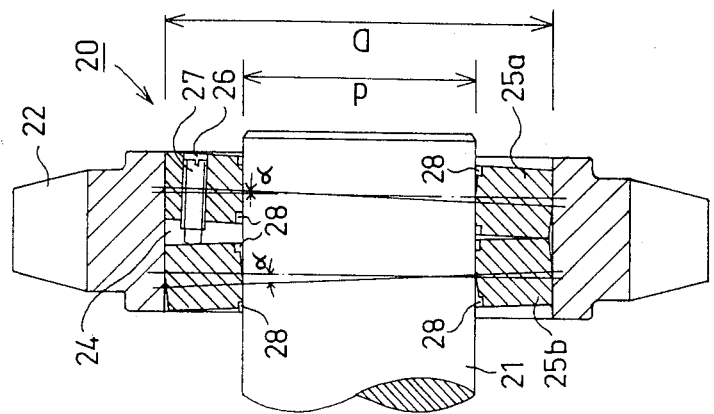

FIG. 2 presents, in section, another advantageous embodiment of a friction joint according to the invention, adapted to the mounting of a hubless sprocket wheel on a shaft.

Figure 3:
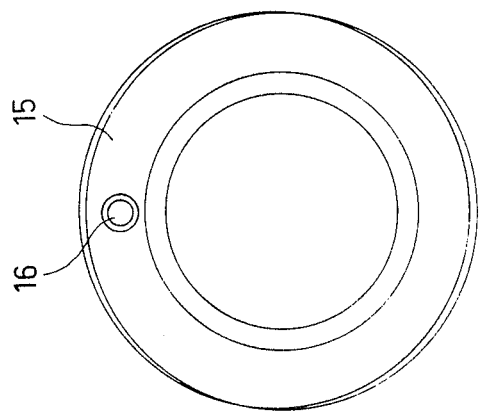

FIG. 3 presents a front view of an advantageous embodiment of friction ring employed in a friction joint according to the invention.

Figure 4:
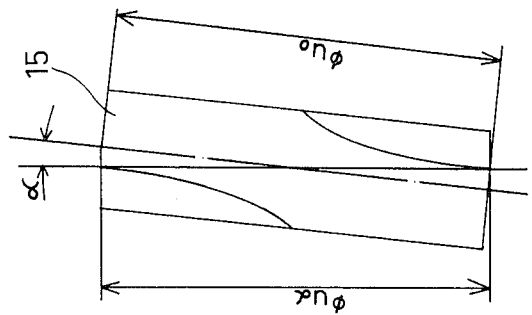

FIG. 4 presents in elevational view, the friction ring of FIG. 3, tilted through the angle $\alpha$.

Figure 5:
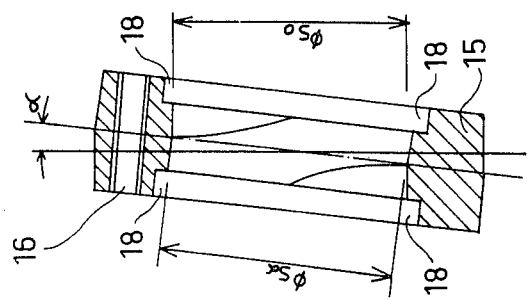

FIG. 5 shows the friction ring of FIG. 4 in section.

DESCRIPTION OF THE PREFERRED EMBODIMENTS

In the embodiment of FIG. 1, the friction joint of the invention in general has been indicated with the reference numeral 10. In this embodiment, the friction joint 10 is employed to mount on the shaft 11 a sprocket wheel 12 with hub. The shaft diameter has been indicated by d and the inner diameter of the sprocket wheel, by D. Reference numeral 13 indicates the hub of the sprocket wheel 12.

In accordance with the fundamental idea of the invention, the shaft 11 and the hub 13 of the sprocket wheel 12 have been fixed to each other by the aid of an annular sleeve-like member 15 so that when the sleeve-like member 15 is tilted through the angle $\alpha$ the inner surface of the sleeve-like member 15 creates an interlocking with the shaft 11 and similarly the outer surface of the sleeve-like member 15 creates an interlocking with the hub 13 of the sprocket wheel 12. To the purpose of mounting the sleeve-like member 15 on the shaft 11 and within the hub 13 of the sprocket wheel 12, an annular recess 14 with a size consistent with the inner diameter D of the hub 13 is formed in the hub 13 of the sprocket wheel 12.

In the embodiment of FIG. 1, the tilting of the sleeve-like member 15 has been accomplished with the aid of a tightening screw 17, disposed in a threaded hole 16 provided through the end face of the sleeve-like member 15. In order to facilitate the insertion of the sleeve-like member 15, annular recesses 18 have been provided in the end faces of the sleeve-like member 15. It should be noted that the sleeve-like member 15 is inserted in its place encircling the shaft 11, in the annular space 14, in non-tilted position, in which the sleeve-like member 15 does not fix the shaft 11 to the hub 13 of the sprocket wheel 12.

In the embodiment of FIG. 2, another advantageous embodiment of the friction joint of the invention has been generally indicated with the reference numeral 20. With the aid of the friction joint 20, the shaft 21 is fixed to the hubless sprocket wheel 22. The diameter of the shaft 21 has been denoted by d and the inner diameter of the sprocket wheel 22, by D. In this embodiment there have been fitted around the shaft 21, in the space 24, two sleeve-like members 25a and 25b. One sleeve-like member 25a has been provided with a threaded hole 26 piercing its end face, and in this hole a tightening screw 27 has been placed. Tightening of the screw 27 has the effect that both sleeve-like elements are simultaneously tilted through opposite, equal angles $\alpha$, whereby the inner surfaces of the sleeve-like members 25a and 25b become interlocked with the shaft 21 and similarly their outer surfaces, with the sprocket wheel 22. In order to facilitate the insertion of the sleeve-like members 25a and 25b, annular recesses 28 have been provided in their end faces.

The outer diameter of the sleeve-like member 15 depicted in FIGS. 3–5, $\phi_{u\alpha}$, has been ground with the sleeve-like member 15 tilted through said angle $\alpha$ to the respective dimension $\phi_{u\alpha}$, which is equal to or larger than the inner diameter D of the sprocket wheel 12, as shown in FIG. 4. In FIG. 4, the dimension $\phi_{uo}$ of the sleeve-like member 15 refers to the diameter when the sleeve-like member 15 is in non-tilted position, i.e. when the angle $\alpha$ is zero. The said dimension $\phi_{uo}$ is smaller than the inner diameter D of the sprocket wheel 12 by a clearance $\Delta_1$. Thus, the clearance $\Delta_1$ is understood to be that clearance which is present between the sleeve-like member 15 and the hub 13 of the sprocket wheel when the sleeve-like member is squarely positioned, i.e., where the angle is zero.

As shown in FIG. 5, the inner diameter $\phi_{s\alpha}$ of the sleeve-like member 13 is understood to be the inner diameter of the sleeve-like member 15 when the sleeve-like member 15 is tilted through the angle $\alpha$. The inner diameter of the sleeve-like member 15, $\phi_{s\alpha}$, is ground to this dimension with the sleeve-like member 15 tilted through the angle $\alpha$, and the magnitude of this dimension $\phi_{s\alpha}$ is equal to or smaller than the diameter d of the shaft 11. In FIG. 5, the dimension $\phi_{so}$ refers to the inner diameter of the sleeve-like member 15 when the sleeve-like member 15 is squarely positioned, i.e. when the angle $\alpha$ is zero. This diemsnion $\phi_{so}$ exceeds the shaft diameter d by the clearance $\Delta_2$. Thus the clearance $\Delta_2$ is understood to be the clearance which is present between the sleeve-like member 15 and the shaft 11 when the sleeve-like member 15 is squarely positioned.

In the foregoing only certain advantageous embodiments of the invention have been presented, and it is obvious to a person skilled in the art that numerous modifications thereof can be made within the scope of the inventive idea presented in the claims following below.

I claim:

1. In a friction joint for both axially and rotatably fixing a first machine element with respect to a second machine element, said first machine element being partially received in a cavity formed in said second machine element to define an annular space between an outer surface of said first machine element and an inner cavity-defining surface of said second machine element, the friction joint including at least one sleeve-like member having inner and outer circumferential surfaces and opposed end faces, said sleeve-like member being mounted so as to extend around said first machine element in said annular space, the improvement comprising: said at least one sleeve-like member is mounted for tilting movement between a first non-tilted position and a second tilted position angularly displaced from said first non-tilted position and wherein in said first non-tilted position, said inner circumferential surface of said at least one sleeve-like member is in non-locking relationship with and free to rotate with respect to said outer surface of said first machine element and said outer circumferential surface of said at least one sleeve-like member is in non-locking relationship with and free to rotate with respect to said inner cavity-defining surface of said second machine element and wherein in said second tilted position, said inner circumferential surface of said at least one sleeve-like member frictionally interlocks with said outer surface of said first machine element and, simultaneously therewith, said outer circumferential surface of said at least one sleeve-like member frictionally interlocks with said inner cavity-defining surface of said second machine element to prevent both axial and rotational movement of said first and second machine elements with respect to each other, and means for tilting said at least one sleeve-like member from said first non-tilted position to said second tilted position.

2. The combination of claim 1 wherein said tilting means comprise a threaded bore formed through said at least one sleeve-member opening at said opposed end faces thereof, and a threaded screw-like member threadedly disposed in said bore.

3. The combination of claim 2 wherein said screw-like member includes a head end adapted to abut against a substantially transversely extending interior surface of said second machine element to tilt said sleeve-like member.

4. The combination of claim 2 wherein said friction joint comprises two of said sleeve-like members mounted so as to extend around said first machine element in said annular space, and wherein said tilting means comprise said threaded bore formed through one of said sleeve-like members opening at said opposed end faces thereof, and wherein said threaded screw-like member disposed in said bore includes a head end adapted to abut against an opposed end face of the other of said sleeve-like members to simultaneously tilt both of said sleeve-like members to respective second tilted positions.

5. The combination of claim 1 wherein in each of said at least one sleeve-like members, an annular recess is formed in each respective end face thereof, said annular recesses adjoining said inner circumferential surface of said sleeve-like member.

6. The combination of claim 1 wherein said first machine element comprises a shaft and said second machine element comprises a sprocket wheel having a hub adapted to receive said shaft.

7. The combination of claim 1 wherein said first machine element comprises a shaft and said second machine element comprises a hubless sprocket wheel.

8. The combination of claim 6 wherein said outer circumferential surface of said at least one sleeve-like member is shaped such that the outer diameter of said sleeve-like member is substantially equal or greater than the inner diameter of said sprocket wheel when said sleeve-like member is in said second tilted position, and such that the outer diameter of said sleeve-like member is less than the inner diameter of said sprocket wheel when said sleeve-like member is in said first non-tilted position to define a clearance between said sprocket wheel and said sleeve-like member when the latter is in said first non-tilted position.

9. The combination of claim 7 wherein said outer circumferential surface of said at least one sleeve-like member is shaped such that the outer diameter of said sleeve-like member is substantially equal or greater than the inner diameter of said sprocket wheel when said sleeve-like member is in said second tilted position, and such that the outer diameter of said sleeve-like member is less than the inner diameter of said sprocket wheel when said sleeve-like member is in said first non-tilted position to define a clearance between said sprocket wheel and said sleeve-like member when the latter is in said first non-tilted position.

10. The combination of claim 6 wherein said inner circumferential surface of said at least one sleeve-like member is shaped such that the inner diameter of said sleeve-like member is substantially equal or less than the diameter of said shaft when said sleeve-like member is in said second tilted position, and such that the inner diameter of said sleeve-like member is greater than the diameter of said shaft when said sleeve-like member is in said first non-tilted position to define a clearance between said shaft and said sleeve-like member when the latter is in said first non-tilted position.

11. The combination of claim 7 wherein said inner circumferential surface of said at least one sleeve-like member is shaped such that the inner diameter of said sleeve-like member is substantially equal or less than the diameter of said shaft when said sleeve-like member is in said second tilted position, and such that the inner diameter of said sleeve-like member is greater than the diameter of said shaft when said sleeve-like member is in said first non-tilted position to define a clearance between said shaft and said sleeve-like member when the latter is in said first non-tilted position.

12. The combination of claim 8 wherein said inner circumferential surface of said at least one sleeve-like member is shaped such that the inner diameter of said sleeve-like member is substantially equal or less than the diameter of said shaft when said sleeve-like member is in said second tilted position, and such that the inner diameter of said sleeve-like member is greater than the diameter of said shaft when said sleeve-like member is in said first non-tilted position to define a clearance between said shaft and said sleeve-like member when the latter is in said first non-tilted position.

13. The combination of claim 9 wherein said inner circumferential surface of said at least one sleeve-like member is shaped such that the inner diameter of said sleeve-like member is substantially equal or less than the diameter of said shaft when said sleeve-like member is in said second tilted position, and such that the inner diameter of said sleeve-like member is greater than the diameter of said shaft when said sleeve-like member is in said first non-tilted position to define a clearance between said shaft and said sleeve-like member when the latter is in said first non-tilted position.

14. The combination of claim 1 wherein said inner and outer circumferential surfaces of said at least one sleeve-like member include inner and outer surface regions, and wherein in said first non-tilted position of said at least one sleeve-like member, said inner surface regions are in non-engaging relationship with said outer surface of said first machine element and said outer surface regions are in non-engaging relationship with said inner cavity-defining surface of said second machine element, and wherein in said second tilted position of said at least one sleeve-like member, said inner surface regions are in friction-locked surface contact with said outer surface of said first machine element and said outer surface regions are in friction-locked surface contact with said inner cavity-defining surface of said second machine element.

* * * * *